(12) United States Patent
Augst

(10) Patent No.: US 10,526,989 B2
(45) Date of Patent: Jan. 7, 2020

(54) METHOD, SYSTEM AND MOBILE USER APPLIANCE FOR ADAPTING AN ENERGY UTILIZATION PROCESS OF A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/114,469

(22) Filed: Aug. 28, 2018

(65) Prior Publication Data

US 2019/0063354 A1 Feb. 28, 2019

(30) Foreign Application Priority Data

Aug. 29, 2017 (DE) .................. 10 2017 215 054

(51) Int. Cl.
*G06F 19/00* (2018.01)
*F02D 41/14* (2006.01)
*B60W 10/06* (2006.01)
*F02D 41/00* (2006.01)
*G07C 5/08* (2006.01)
(Continued)

(52) U.S. Cl.
CPC ......... *F02D 41/1406* (2013.01); *B60W 10/06* (2013.01); *F02D 41/0025* (2013.01); *F02D 41/0072* (2013.01); *F02D 41/021* (2013.01); *F02D 41/1402* (2013.01); *G07C 5/0841* (2013.01); *B60K 2015/03157* (2013.01); *F02D 2200/0402* (2013.01); *F02D 2200/0612* (2013.01)

(58) Field of Classification Search
CPC .. B60L 3/12; B60L 15/2045; B60L 2240/622; B60L 2250/18; B60W 30/18; F02D 41/0025; F02D 41/1406; F02D 41/0027; F02D 41/021; F02D 41/1445; F02D 41/1498; F02D 2200/0612
USPC ................................ 701/101, 102, 114, 115
See application file for complete search history.

(56) References Cited

U.S. PATENT DOCUMENTS 10,378,486 B2 * 8/2019 Dudar ................ F02M 25/0827
2019/0040822 A1 * 2/2019 Dudar ................ F02M 25/0818
(Continued)

*Primary Examiner* — John Kwon
(74) *Attorney, Agent, or Firm* — Crowell & Moring LLP

(57) ABSTRACT

Method, apparatus and mobile user appliance for adapting an energy utilization process of a vehicle. At least one value of an energy utilization characteristic quantity is ascertained that represents a first energy utilization process in a first vehicle, and a value of a parameter is ascertained that represents at least one constraint of the energy utilization in the first vehicle during the energy utilization process. A mathematical relationship between at least one of the provided values of an energy utilization characteristic quantity, the values of the parameters of the first vehicle and parameters for a possible second energy utilization process of a second vehicle is ascertained. Further, a data record is provided on the basis of the ascertained mathematical relationship, and a profile data record is provided that comprises the data record. Depending on the profile data record of the first vehicle and second parameter, a fuel composition and/or a split of energy types for a drive system of a second vehicle and/or control data for an energy distribution process in a second vehicle is/are ascertained for the second energy utilization process.

19 Claims, 1 Drawing Sheet

(51) Int. Cl.
*F02D 41/02* (2006.01)
*B60K 15/03* (2006.01)

(56) References Cited

U.S. PATENT DOCUMENTS

| | | | |
|---|---|---|---|
| 2019/0055905 A1* | 2/2019 | Dudar | F02D 41/004 |
| 2019/0186392 A1* | 6/2019 | Dudar | F02D 41/0037 |
| 2019/0186422 A1* | 6/2019 | Dudar | F02M 25/0809 |

* cited by examiner

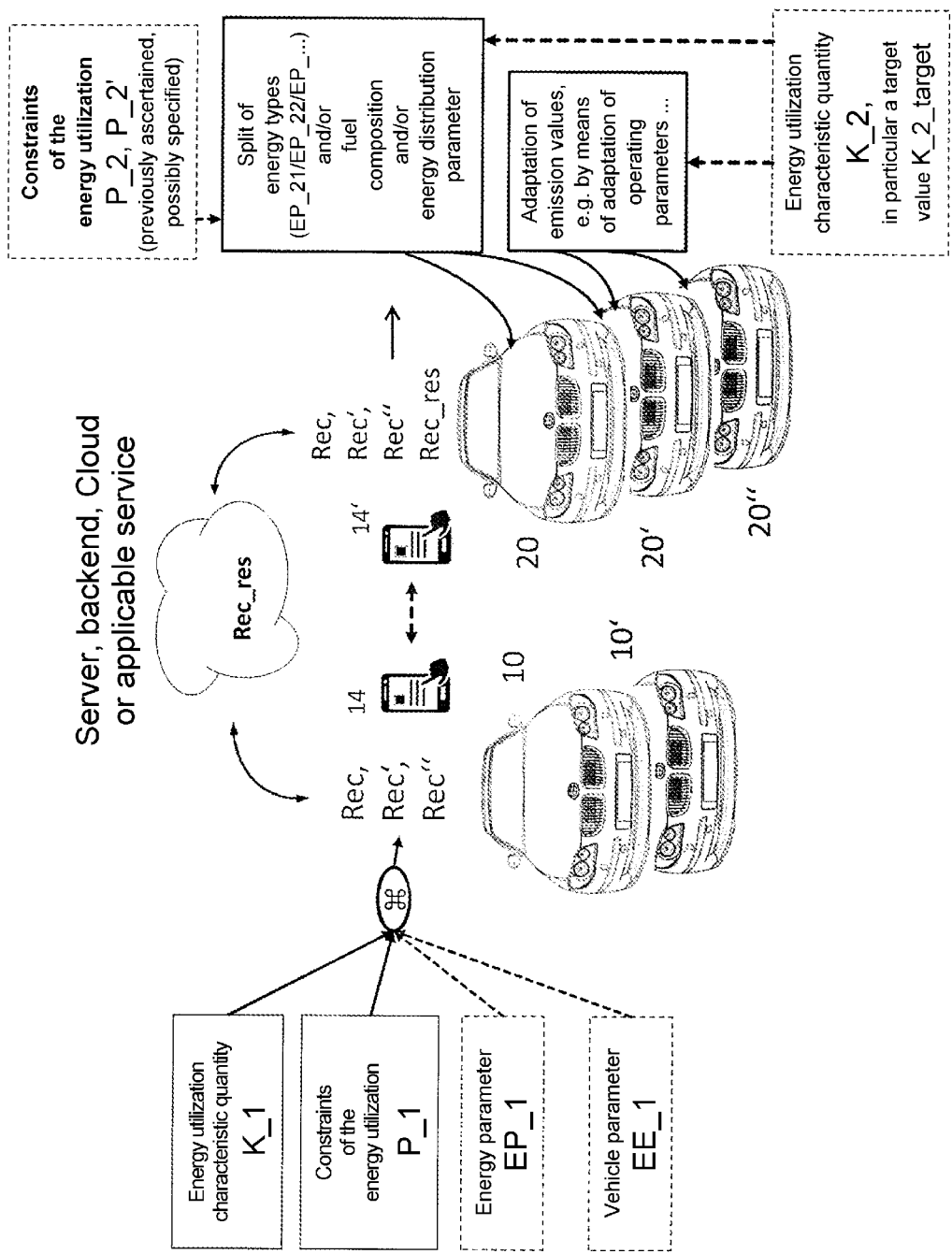

METHOD, SYSTEM AND MOBILE USER APPLIANCE FOR ADAPTING AN ENERGY UTILIZATION PROCESS OF A VEHICLE

CROSS REFERENCE TO RELATED APPLICATION

This application claims priority under 35 U.S.C. § 119 from German Patent Application No. 10 2017 215 054.8, filed Aug. 29, 2017, the entire disclosure of which is herein expressly incorporated by reference.

BACKGROUND AND SUMMARY OF THE INVENTION

The invention relates to a method, a system and a mobile user appliance for adapting an energy utilization process of a vehicle, in particular for splitting energy types for a drive system of a vehicle or for controlling an energy distribution process in a vehicle.

Modern drive systems of motor vehicles having internal combustion engines can automatically adapt themselves to parameters of a fuel. In this case, the internal combustion engines of these modern vehicles can in particular utilize different grades of a conventional liquid fuel (Super 95, 98, E, ethanol in the form widely used in South America, for example) or natural gas. Multiple fuel grades within a class are mixable with one another to a greater or lesser extent.

The quality of the different fuels is different. Even within a standard, substantial quality differences can arise. Both the standards of fuel grades and their actual quality can change considerably during the life of a motor vehicle.

The object on which the invention is based is that of providing a method, a corresponding system and a mobile user appliance for adapting an energy utilization process of a vehicle that allow improved energy utilization by the vehicle. Further, it is the object of the invention to improve, or bring into line with a prescribed target value, emission values, in particular exhaust gas values of one or more vehicles, at least intermittently.

The object is achieved by the features of the independent patent claims. Advantageous developments of the invention are contained in the subclaims.

According to a first aspect and a second aspect, the invention is distinguished by a method and a corresponding apparatus for adapting an energy utilization process of at least one vehicle. In this case, at least one value of an energy utilization characteristic quantity is ascertained that represents a first energy utilization process in a first vehicle, and at least one value of a parameter is ascertained that represents at least one constraint of the energy utilization in the first vehicle during the first energy utilization process, and then a mathematical relationship between at least one or more of the provided values of the at least one energy utilization characteristic quantity, the applicable values of the parameters of the first vehicle and one or more parameters, representing in particular a constraint of the energy utilization, for a possible second energy utilization process of a second vehicle is ascertained. Further, a data record and/or learning data is/are provided on the basis of the at least one ascertained mathematical relationship, and a profile data record is provided that comprises the learning data and/or the data record, and, depending on the profile data record of the first vehicle and of the at least one second parameter, a fuel composition and/or a split of energy types for a drive system of at least one second vehicle is/are ascertained and/or control data for an energy distribution process in a second vehicle are ascertained, in each case for a second energy utilization process.

In this case, the second vehicle is different than a first vehicle. Preferably, the method is applied to a multiplicity of first vehicles and/or to a multiplicity of second vehicles in this case. A respective profile data record in this case can also comprise particular selected portions of one or more data records and/or of the learning data. By way of example, the profile data record can expediently comprise selected data sections of one or more ascertained data records and/or learning data.

The one or more parameters describing at least one constraint of the energy utilization for a possible second energy utilization process of a second vehicle can in particular be understood to mean probable parameter values, expected parameter values or parameter values that can (currently) be expected and/or are within particular expediently chosen value limits, said parameter values representing the constraints of the energy utilization in one or more second vehicles. In other words, the "possible" energy utilization process means an energy utilization process in one or more second vehicles, in particular in one or more particular second vehicles, that takes place, will take place or is needed in particular with a probability that exceeds a limit value. It is then possible for e.g. an expediently determined or selected profile data record, in particular for one or more particular second vehicles, to be provided in particular at a particular (suitable) time and/or for a particular (suitable) route section.

Preferably, one or more parameters for a possible second energy utilization process of a second vehicle can represent particular limit values (limit values of particular parameter values), e.g. limit values to be observed in particular locations. By way of example, one or more parameters for a possible second energy utilization process of a second vehicle can also be ascertained and in particular queried (as part of the method) on the basis of the data from one or more second vehicles, e.g. in a second vehicle, in a mobile user appliance carried in the second vehicle, in a computation unit arranged at a distance (server, backend, cloud, Internet portal). By way of example, data pertaining to at least one or more parameters for a possible second energy utilization process of a second vehicle can be queried and then a suitable profile data record for at least one second vehicle can be ascertained and provided.

Preferably, said possible second energy utilization process of a second vehicle is in this case a probable energy utilization process of a second vehicle that e.g. will be carried out with an above average probability. The features and/or parameters of at least one such second energy utilization process can be pre-ascertained in the method.

Preferably, the mathematical relationship and consequently also at least one profile data record can also relate to two or more second parameters depicting different, in particular alternative, constraints of the energy utilization that can arise for a second energy utilization process in a second vehicle, in particular in a particular group or category of the second vehicles.

Preferably, the profile data record relates to predicted probable values of a possible, in particular probable, energy utilization process. In a simplified example, a profile data record generated for a particular season (e.g. in summer) or for use in a particular season can at least preferably take into consideration summer constraints of the energy utilization.

In an example of the method, one constraint used for the energy utilization and/or fuel utilization may be one or more operating parameters of a driver assistance system of the vehicle. In this case, at least one parameter can represent one or more operating parameters (e.g. or states) of the operation of a driver assistance system of the first vehicle.

Particularly preferably, this involves a driver assistance system for assisting longitudinal guidance and/or transverse guidance of the vehicle or for at least partially automated driving. It is also possible for such driver assistance systems to comprise a multiplicity of modes of operation, settings, alternatively usable logics, etc. that can be actively used or come into force during a journey.

In an advantageous configuration, the taking into consideration can comprise a piece of information pertaining to the use of a driver assistance system, in particular parameters of the driver assistance system, in particular during the one first energy utilization process.

In a further advantageous configuration according to the first and second aspects, at least one value of a second parameter relates to a predicted constraint of a particular second energy utilization process of at least one particular second vehicle.

Preferably, the method involves at least two values (applicable mutatis mutandis) of at least two second parameters relating to at least two different, predicted or probable constraints of a particular second energy utilization process in at least one second vehicle. In this case, the second energy utilization process in a second vehicle can involve a respective parameter suitable for the constraint that is then valid being selected, in particular changeover to said parameter being effected during the energy utilization process. It is also possible for the respective parameters best suited to the constraints to be taken into consideration in two different second vehicles.

During subsequent adaptation of the second energy utilization process, it is then possible for one or more parameters or states of the driver assistance system to be taken into consideration as a constraint for optimizing the energy utilization process in a second vehicle.

Particularly preferably, at least one provided profile data record in this case takes into consideration at least one particular energy utilization process preferably in a particular second vehicle. In this case, the profile data record may be optimized for the applicable constraints to be expected for the energy utilization.

A particular advantage is obtained in the method if the at least one mathematical relationship is ascertained outside the first vehicle and/or second vehicle. Therefore, the advantage is also obtained that the computation power present or usable in the vehicles for carrying out the method is not used or is used less. By way of example, a second vehicle can use a profile data record optimized specifically for this vehicle and/or specifically for the expected constraint of the energy utilization and/or for the expected use of the vehicle.

In a further advantageous configuration according to the first and second aspects, a value of a parameter for a current or pre-ascertained, in particular by means of a probability calculation, constraint of a particular second energy utilization process of at least one particular second vehicle is ascertained. In this case, a value of a parameter for a constraint of a particular second energy utilization process can be ascertained for a particular interval of time.

This can involve various methods, in particular based on the probability calculation, and/or a simulation of a neural network being set up or configured such as to ascertain a constraint of a particular second energy utilization process, in particular for a particular second vehicle, in advance.

In a further advantageous configuration according to the first and second aspects, one or more profile data records to be used are provided for at least one second vehicle on the basis of a current or pre-ascertained parameter for a current or pre-ascertained constraint of a second energy utilization process. In this case, the second energy utilization process may preferably be a particular second energy utilization process. A profile data record to be used may in this case be a suitable, more expediently suitable or particularly suitable profile data record. By way of example, the method, e.g. in a backend, involves such a profile data record to be used being ascertained and/or provided for a second vehicle, in particular for a particular second vehicle.

In a further advantageous configuration according to the first and second aspects, a current or pre-ascertained parameter for a current or pre-ascertained constraint of a second energy utilization process is taken as a basis for selecting a suitable profile data record and/or ascertaining a suitable profile data record. In this case, the one second energy utilization process may preferably be a particular second energy utilization process.

Particularly preferably, a suitable profile data record can be ascertained from at least two profile data records by means of interpolation and/or weighting and/or statistical optimization. By way of example, a profile data record suitable for a particular current or pre-ascertained constraint represented by an applicable parameter can be ascertained.

In a further advantageous configuration according to the first and second aspects, the change in the constraint for a second energy utilization process that exceeds a particular measure is ascertained, whereupon retrieval of a suitable profile data record takes place or is prompted. In this case, the one second energy utilization process may preferably be a particular second energy utilization process.

In particular, the method comprises providing wireless transmission of the one profile data record or of a change in the profile data record of applicable data packets and/or sections of the data stream of the profile data record to a second vehicle. In this case, the ascertainment and/or transmission of a profile data record or of the change in the profile data record of applicable data packets and/or sections of the data stream can be effected in particular for an ascertained or pre-ascertained change in the constraint for a second energy utilization process, in particular in a particular second vehicle. In this case, different profile data records or a respective change in the profile data record of applicable data packets and/or sections of the data stream of the profile data record can be transmitted to two different second vehicles.

The transmission can be effected using a "method" (for example a push method), in particular prompted or controlled by a computation unit arranged outside the (first) vehicle, or e.g. by a method (for example a "pull method") prompted or controlled by a computation unit (installed or carried in a second vehicle) of the vehicle.

In a further advantageous configuration according to the first and second aspects, ascertaining, selecting, providing and/or retrieving the at least one profile data record for at least one second vehicle is performed on the basis of a target value for at least one emission value for at least one second energy utilization process of the at least one second vehicle. In other words, such a profile data record as is suitable or is particularly well suitable for achieving a particular target value for at least one emission value, or an improvement in an emission value, e.g. in respect of a particular target value or a target value range, can be ascertained, selected, provided or (actively) retrieved in particular using means of a first vehicle, using means of a second vehicle or using means of said computation unit arranged at a distance.

In a further advantageous configuration according to the first and second aspects, energy types for a drive system of at least one second vehicle and/or control data for an energy distribution process for a second vehicle are split such that achievement of a target value for at least one emission value or of an improvement in an emission value, e.g. in respect of a particular target value or a target range, is sought or performed.

By way of example, the profile data record can comprise energy preset data that can be changed by a user of the first vehicle and that are representative of a minimum intake quantity of at least one of the energy types of the first vehicle at an energy supply point and/or are representative of a limitation for fuel grades for the first vehicle and/or are representative of an association of fuel grades with the first vehicle.

In a further advantageous configuration according to the first and second aspects, one or more values of a fuel parameter can be ascertained at least for each of two fuel types or fuel grades usable for the operation of the internal combustion engine, whereupon the profile data record is ascertained on the basis of the respective value or the respective values of the fuel parameter.

In particular, the method according to the invention can comprise at least one prescribed criterion or an optimization function that is taken into consideration when determining an (appropriately optimized) fuel composition and/or when splitting the energy types and thus ensures an optimal fuel composition and/or an optimum split of energy types for a second energy utilization process in a second vehicle.

By way of example, the ascertained fuel composition and/or the split of energy types for the drive system of the first vehicle for the second energy utilization process is/are taken as a basis for transmitting a preset for a respective exhaust gas quantity of the energy types and/or the respective fuel types and/or the fuel composition to an energy supply point. The energy supply point may in this case comprise a filling station and/or an (electrical) charging station, in particular for a vehicle drive battery. It is therefore possible for a vehicle to take in different energy types (electric charge and/or gasoline and/or diesel and/or natural gas and/or hydrogen) at the energy supply point.

The ascertained preset quantities can be transmitted to the energy supply point, so that the energy supply point can adapt its delivery quantities. The transmission in this case may be configured in particular by means of reading in the information using at least one reader or sensor of the energy supply point and/or by means of a or the mobile user appliance. For example, an RFID chip fitted close to the tank flap can be read. Said RFID chip is again very easy to write information to/configure using the smartphone.

In this case, the result of an optimization calculation (or only the required information for reading into an optimization formula) can be transmitted directly or indirectly to an energy point and can prompt delivery of energy types or fuel compositions there, said delivery being dependent on the ascertained optimum.

The transmitted data can be taken as a basis for measuring off the delivery quantities in suitable fashion, so that a pump at the energy supply point stops pumping at exactly the right time or times and/or the charging station, including charging characteristic curves, is controlled. Alternatively or additionally, a display displaying the respective optimum delivery quantities or displaying the quantities still to be delivered may be provided on a display at the energy supply point. Alternatively or additionally, such a display can also appear on the mobile user appliance.

Advantageously, it is thus possible for an increase in efficiency to be achieved for the energy utilization and for a contribution to be made to looking after the environment, in particular as a result of specific reduction of $CO_2$ and/or nitrogen oxide and/or fine dust emissions, e.g. as a proportional or partial or cumulative value. Therefore, specific pollutant reduction can take place in particular to look after the environment or to avoid traffic bans in particular towns.

The method can therefore be used to adapt an internal combustion engine based and/or electric motor based drive system of the first vehicle and thus to achieve an optimum mode of operation and mode of driving in each case. In particular in the case of vehicles that can be driven by two or more energy sources, for example gasoline types, natural gas and electric charge, a vehicle driver is for the most part overtaxed or unnecessarily burdened with finding a respectively advantageous, let alone optimum, mode of operation and mode of driving. A further advantage is that the energy utilization, in particular the fuel utilization, or wear and/or consumption of vehicle components of vehicles, can be adapted to suit fuel standards that have changed during a life of the vehicles and/or new fuel types. It is particularly advantageous that no adaptation (in particular no adaptation of the hardware) of the vehicle is required, which allows fast market introduction and even vehicles that are already in production can use the method for adapting energy utilization without retrofitting of hardware. The advantages of the method can therefore also be rolled out to vehicles in production (without retrofitting of hardware). And as already stated, a state and/or a degree of wear and/or a remaining mileage or a change in the state and/or in the degree of wear and/or in the remaining mileage of one or more prescribed vehicle components can be ascertained on the basis of one or more profile data records.

The first and second energy utilization processes each relate in particular to an energy conversion process for a drive energy that is essentially used for movement. The first and second energy utilization processes each relate in particular to energy conversion within the drive system of the first vehicle, in particular within an internal combustion engine and/or within the first drive train and/or chassis of the first vehicle. The first vehicle can have one or more internal combustion engines in this case. Additionally, the first vehicle can have an electric drive and may therefore be in the form of a hybrid vehicle. For energy utilization by an internal combustion engine, instead of the term energy utilization it is also alternatively or additionally possible for the term fuel utilization to be used mutatis mutandis.

The values of the at least one energy utilization characteristic quantity and the values of the at least one parameter are preferably ascertained for a multiplicity of operating phases of the first vehicle, the ascertainment also comprising capture using a sensor apparatus, for example.

The at least one energy utilization characteristic quantity may be representative of at least one exhaust gas characteristic quantity and/or an actually achieved torque characteristic curve and/or at least one captured variable from a knock sensor of the internal combustion engine of the vehicle and/or one or more ignition angles and/or ignition times.

Preferably, multiple parameters are ascertained that each represent a circumstance or constraint of the energy utilization for the first vehicle and/or the internal combustion engine and/or the surroundings of the first vehicle during the first energy utilization process. The parameters therefore characterize constraints that were present during the respective energy utilization. The parameter can comprise an operating variable of the internal combustion engine and/or of the vehicle, for example an engine speed and/or a torque and/or a tire temperature and so on. Alternatively or additionally, the parameter can comprise an ambient state variable, for example a humidity, an exterior temperature and/or an air pressure and so on. The at least one parameter can represent a permanent or variable constraint of the fuel utilization for the first vehicle and/or the internal combustion engine and/or the surroundings of the first vehicle.

A permanent constraint that can be considered in this case is a slowly variable constraint, for example an age of the vehicle or of its components (for example of an engine oil and/or a consumable) or a scarcely variable driving profile or regular routes and so on. Variable constraints that can be looked at are rapidly variable circumstances, for example an exterior temperature, an air pressure, a humidity or driving profiles or routes characterized by special features. Advantageously, it is thus possible for ambient conditions (temperature, air pressure, humidity and so on) in which different vehicles and different fuels and drive systems need to operate and that can vary within wide ranges to be taken into consideration during the adaptation of energy utilization, in particular fuel utilization.

The values of the at least one energy utilization characteristic quantity are stored and/or provided in association with the respectively associated values of the at least one parameter of the energy utilization, for example. It is thus possible for the mathematical relationship between the at least one or the multiple provided values of the at least one energy supply characteristic quantity and the applicable values of the parameters to be ascertained and for learning data to be provided.

Said mathematical relationship can comprise a predefined mathematical law, rule, specification and/or relation between one or more energy utilization characteristic quantities and one or more of the applicable parameters. The mathematical relationship can then represent coefficients for one or more, in particular predetermined, equations, polynomials or a simulation. This is in particular an expediently formed mathematical relationship.

In a simplified case, the mathematical relationship can comprise an association between one or more energy utilization characteristic quantities and one or more of the applicable parameters, which are in particular based on the same intervals of time. In a simplified example of the mathematical relationship, values of the at least one energy utilization characteristic quantity can be represented, associated, stored and/or provided for the respective associated values of the at least one parameter representing constraints of the energy utilization in a first vehicle, for example. In particular, the respective figures relating to the same intervals of time, in particular, can be associated with one another.

The mathematical relationship may be designed such that a result of the mathematical relationship represents a dependency between two or more parameters of the at least one constraint of the energy utilization and represents two or more applicable energy utilization characteristic quantities. Particularly preferably, the mathematical relationship represents a solution space for a multiplicity of the properties of the first vehicle for one or more (particular) energy utilization processes. Preferably, the mathematical relationship can also be used to represent one or more properties of the first vehicle, at least in part in a system theory manner (i.e. with suitable relationships between the resultant input and output variables).

The provided profile data record in this case can comprise all characteristic quantities, or characteristics quantities selected according to particular criteria, of the (predetermined) mathematical relationship. In particular, a selected profile data record can comprise an optimized—depending on an instance of application—selection of the characteristic quantities of the mathematical relationship.

The learning data and/or data record based on the mathematical relationship can also represent a difference or a disparity from a previous value and/or a normal value or average value. The learning data can also directly or indirectly represent a particular change in the data record, in particular by a piece of update information for a prestored or provided data record.

Preferably, a first energy utilization process can be taken as a basis for ascertaining at least some of the values of the data record e.g. within an interval of time; it is then possible for the learning data relating to a change in the data record to be provided in the first vehicle.

The provided profile data record in this case can comprise at least one data record and/or learning data based on one or more ascertained mathematical relationships. In this case, a profile data record can comprise e.g. the data of the data record and/or learning data and a use specification for the data. In simplified terms, the provided profile data record can represent a particular "wealth of experience" (accordingly: data record) or a new "experience" or "update of the experience" (accordingly: learning data) by the first vehicle in respect of one or more energy utilization processes for a multiplicity of different constraints.

Vehicles have specific properties that change over time and for the most part become more apparent as the age of the vehicle increases. The ascertained profile data record can be used to adapt the energy utilization of the vehicle taking into consideration the specific properties such that one or more aspects of the energy utilization of the first vehicle and/or of the second vehicle improve and/or are optimized.

Ascertaining the fuel composition and/or the split of energy types for the drive system of the first vehicle for the second energy utilization process on the basis of the at least one second parameter has the advantage that the energy utilization for the first vehicle can be adapted on the basis of the constraints to be expected for the first vehicle. In particular, the first vehicle can be refueled with at least two different types of fuel.

The at least one energy utilization characteristic quantity can also be referred to as the first influencing variable, which respectively represents a specific energy utilization property of a particular vehicle or a particular vehicle type.

The at least one second parameter can also be referred to as the second influencing variable, which represents a current or predicted constraint or circumstance of the second energy utilization process of the first vehicle.

The profile data record can be completed and/or updated e.g. continually, under event control or at regular intervals of time. In particular, the profile data record can be updated on the basis of respectively new learning data. By way of example, a profile data record already stored in a second vehicle can be updated, depending on a transmitted learning data record ascertained on the basis of the data of a first vehicle. This provides a particularly high level of efficiency by virtue of rapid and effective updating of the method. In this case, it is merely possible for a profile data record having the learning data to be transmitted on the basis of the data of a first vehicle that comprise a change or update of a previous profile data record for the second vehicle, with the change then being made and updated only for the affected portion of the previous profile data record.

The effect that can be achieved thereby is that output data representing a combination of the multiplicity of various permanent constraints and variable constraints can be used to produce resultant data records that are then applicable to a multiplicity of combinations, in particular new combinations, permanent and variable constraints, in particular are applicable with maximum precision.

The values of the at least one energy utilization characteristic quantity can be provided in association with the respectively associated values of a prescribed first data interface. The ascertained profile data record can be provided at a prescribed second data interface. The first data interface and the second data interface may be in the form of one or two interfaces. A control apparatus of the first vehicle can have the first data interface and a mobile user appliance can have the second data interface. In particular, the profile data record can be ascertained by a mobile user appliance. Alternatively or additionally, the mobile user appliance may be designed to take provided vehicle sensor data as a basis for ascertaining the values of the at least one energy utilization characteristic quantity and/or to capture and/or ascertain the values of the at least one first and/or second parameter.

The profile data record can thus also be ascertained on the basis of data from at least one vehicle sensor and/or on the basis of user settings that can be prescribed in particular by means of the mobile user appliance. In this case, the user can change his settings by means of a man/machine interface of the first vehicle and/or by means of a mobile user appliance.

The learning data and/or data records ascertained for various first vehicles can be interchanged by means of a mobile user appliance (smart phone, tablet, "plug-in sat nav, etc.). In this case, these can also be read in and used by other users for specific purposes (using an appropriate app). The learning data and/or the data record can be received or specifically called up by a further mobile user appliance of a user of a second vehicle.

If values of the at least one parameter have not yet been ascertained or have not been ascertained to a sufficient extent to date, for example in the case of a new vehicle, the values of the at least one parameter can also be obtained from a simulation or from values of another vehicle, in particular at the starting point of the method. In a simplified case, they can be input and/or imported and later corrected with genuine measured values.

In an advantageous configuration according to the first and second aspects, one or more values of a fuel parameter is or are ascertained at least for each of two fuel types or fuel grades usable for the operation of the internal combustion engine, and the profile data record is ascertained on the basis of the respective value or the respective values of the fuel parameter.

This has the advantage that the energy utilization characteristic quantity can also be evaluated for the respectively used fuel. The value or values of the at least one fuel parameter can each be ascertained after a refueling process. The at least one fuel parameter may be representative of proportions of different fuel types and/or a mix ratio of prescribed fuel components in the respective fuel currently used in the vehicle.

The value of the at least one fuel parameter can comprise a fuel grade and/or a fuel type and/or octane number and/or a viscosity and/or a proportion of a fuel component and so on. The profile data record can thus be used, for example, to ascertain a change in the at least one fuel parameter that is required for the ascertained energy utilization characteristic quantity, in particular a fuel utilization characteristic quantity, to approach a prescribed setpoint fuel utilization characteristic quantity. The setpoint fuel utilization characteristic quantity may be an optimum value for the fuel utilization characteristic quantity.

In a further advantageous configuration according to the first and second aspects, the values of the at least one second parameter are ascertained on the basis of
a driving statistic of the first vehicle and/or
a vehicle setting for a drive mode of the first vehicle and/or
at least one precomputed route for the first vehicle and/or
a predicted exterior temperature and/or
current exhaust data of the first vehicle and/or
data from a knock sensor of the internal combustion engine of the first vehicle and/or
calendar data of a user of the first vehicle and/or
driver settings of the first vehicle and/or
a use of the first vehicle for a specific purpose.

This has the advantage that the current or predicted constraints can be computed accurately, flexibly and efficiently. Furthermore, the method can be carried out such that a data aggregation is effected by means of probability calculation. Further, it is possible for further information to be read from a digital map, in particular a learning map, and taken into consideration.

In a further advantageous configuration according to the first and second aspects, the profile data record comprises energy preset data that can be changed by a user of the second vehicle and that are representative of a minimum intake quantity of at least one of the energy types for the second vehicle at an energy supply point and/or are representative of a limitation for fuel grades for the second vehicle and/or are representative of an association of fuel grades with the second vehicle.

Alternatively or additionally, this also allows incorrect refueling (for example diesel/gasoline) to be automatically prevented. In this case, for example the ascertained values of the at least one second parameter and a piece of information about refueling performed or intended (from the gas pump) can be taken as a basis for outputting a piece of information or a warning and/or preventing or interrupting the supply of fuel.

In a further advantageous configuration according to the first and second aspects, the split of the energy types comprises a split between
natural gas and gasoline or diesel or
electric charge and gasoline or diesel or
natural gas and electric charge.

The splitting of the energy types can be optimized for a prescribed route and/or for a particular user in regard to one or more prescribed optimization criteria, for example by means of a prescribed computer program in a mobile user appliance. Alternatively or additionally, the profile data record or portions of the profile data record can be transmitted to a central device, for example to a backend of the energy supply point or vehicle manufacturer, and the optimum split can be ascertained by means of the central computation unit. In this case, it is also possible for the data pertaining to the split of the energy types to be ascertained, stored and applied for an energy conversion system of the first vehicle as a particularly efficiently achievable "route-oriented consumption plan". At the same time, the data pertaining to the split of the energy types can be used for an input for a partially automatically created journey log, individual statistics or fleet statistics, for example for further optimization or provision.

In particular in this case, the different fuel types and fuel grades may in particular be stored in different tanks.

In a further advantageous configuration according to the first and second aspects, the at least one energy utilization characteristic quantity is representative of a measure of a wear and/or a consumption and/or a reduction in the remaining mileage of a vehicle component.

Therefore, the provided profile data record can be taken as a basis for ascertaining a piece of information or a statement about a change in a state and/or in a degree of wear of the respective vehicle component and/or a remaining mileage of at least one component as a result of the respective energy utilization. The vehicle component can comprise a vehicle engine and/or a drive component and/or a catalytic converter and/or a consumable, in particular a filter and/or a vehicle fluid, in particular an engine oil or a coolant.

In a further advantageous configuration according to the first and second aspects, a state and/or a degree of wear and/or a remaining mileage or a change in the state and/or in the degree of wear and/or in the remaining mileage of one or more prescribed vehicle components, for example a vehicle component of a particular type, in particular over a relatively long period, is ascertained on the basis of one or more of the profile data records.

Said state may in this case be a permanent state, in particular a physical or chemical state. In particular, the vehicle components are vehicle components that have a direct connection to a (particular) energy utilization process. In particular, these may be components of the internal combustion engine, of the drive and/or of the actuators of the chassis.

The change in the state and/or in a degree of wear can also comprise ascertaining, in particular an assessment of, the remaining mileage. The remaining mileage can relate e.g. to a distance traveled (kilometers) and/or an absolute engine speed and/or units of time. A change in the state and/or in a degree of wear and an assessment of the (remaining) life can be ascertained at least in part using means of the mobile user appliance of the user (driver of the vehicle). In this case, profile data records, in particular including further data pertaining to a multiplicity of the vehicles, can be read in using means of the mobile user appliance. In this case, very efficient and precise predictions about the remaining life of particular vehicle components (of a particular vehicle or vehicle type) can be ascertained, for example. Therefore, data pertaining to changes in a state and/or in a degree of wear and/or an assessment of the (remaining) life can also be obtained for vehicles without applicable data capture, IT infrastructure, etc.

The profile data record can alternatively or additionally be ascertained on the basis of information representing a change in a state and/or in a degree of wear of the respective vehicle component, this information being able to relate in particular to a preferably cumulative wear and/or consumption of vehicle components, in this case. Particularly preferably, an applicable mathematical relationship represents the dependencies between at least one constraint of the energy utilization of an energy utilization process and the change in a state and/or in a degree of wear.

The profile data record can alternatively or additionally also be ascertained on the basis of further information derived from the information. This can involve numerous methods of statistical mathematics being applied. For this, the normalized and/or adjusted dependencies can be ascertained. An optimum for an overall optimum fuel, fuel composition or fuel mix can then also be ascertained from a piece of statistical information from many vehicles, which are preferably of the same type and are operated under different constraints, and applied, for example, in particular also in connection with conditions to be expected in future.

Advantageously, one or more profile data records can also be taken as a basis for deriving a piece of information pertaining to an improvement in particular parameters of the vehicle components. In particular, the ascertained data can in this case be taken as a basis for improving the quality of the vehicle components in development or production in specific and efficient fashion. It is also possible for valuable data and/or information pertaining to the improvement of particular vehicle components relating to supplier products or third-party products directly or indirectly to be obtained. For example, it is thus possible for weaknesses in vehicle components to be identified easily and/or explicitly and evaluated to the advantage of the consumer or the vehicle manufacturer.

In a further advantageous configuration according to the first and second aspects, the at least one parameter is representative of a state and/or a remaining mileage of one or more vehicle components of the first vehicle. The energy utilization characteristic quantity therefore also allows a statement about an influence of a state and/or of a remaining mileage of the respective vehicle component on the energy utilization. The vehicle component can comprise a vehicle engine and/or a drive component and/or catalytic converter and/or a consumable, in particular a filter and/or a vehicle fluid, in particular an engine oil or a coolant. It is possible for at least coarse values for the age, the degree of wear and/or remaining life or rated remaining performance of one or more vehicle components to be ascertained.

In a further advantageous configuration in accordance with the first and second aspects, the profile data record is ascertained and provided for each of a multiplicity of first vehicles. Further, the profile data records are taken as a basis, in particular at least some of the respective profile data records in each case are used, for ascertaining and providing a resultant profile data record, and the provided resultant profile data record is taken as a basis for ascertaining the fuel composition and/or the split of energy types for the drive system of the first vehicle and/or of a second vehicle.

Particularly preferably, the at least one resultant profile data record is ascertained (possibly also) on the basis of one or more (particular) second vehicles and/or on the basis of one or more (particular) energy utilization processes.

The sending, receiving or interchange and the aggregation of the respective profile records can preferably be effected by means of at least one mobile user appliance and/or by means of a backend. In this case, targeted interchange of optimization information between two or more users can also take place. As a result, these data intended for interchange can also be configured in extremely compact and, if necessary, absolutely uncritical, in regard to data protection, fashion. By way of example, the interchange can take place via a cloud network, an Internet portal, Bluetooth or the like.

In a further advantageous configuration according to the first and second aspects, at least the values of the at least one energy utilization characteristic quantity and the values of the at least one parameter are each ascertained for prescribed route sections and/or route types and the respective profile data record is associated with the applicable prescribed route sections or the applicable route type.

As such, at least one piece of route-dependent information, in particular a scientific relationship with fuels, can be ascertained based on planned or probable routes.

In a further advantageous configuration according to the first and second aspects, prescribed similarity criteria are taken as a basis for associating the respective profile data record with a prescribed route section and/or a prescribed route type.

Preferably, this is accomplished by transmitting respective profile data records, for example from different first vehicles, to a backend. The association is made by means of the backend or an Internet portal, for example. This has the advantage that the profile data records can be varied on the basis of an input or planned route. Further, it is also possible for at least one piece of route-dependent information, in particular a scientific relationship with fuels, to be ascertained from a database or the backend based on planned or probable routes.

In a further advantageous configuration according to the first and second aspects, the provided profile data record of the first vehicle is taken as a basis for ascertaining a set of settings changes for the energy utilization of a second vehicle, and a prescribed selection of the settings changes is taken as a basis for ascertaining the fuel composition and/or the split of energy types for the drive system of the second vehicle for the second energy utilization process.

The selection of the adaptation measures can be made by means of a prescribed operator control operation on the input apparatus. In this case, acceptance or alteration of settings can be visually displayed, in particular graphically, on a display apparatus of the second vehicle and/or of the mobile user appliance. It is also possible for the settings changes pre-ascertained for the first vehicle and/or a probable result of the settings change to be depicted. In this case, the settings changes can also be selected individually or all together by the user. It is thus possible to visually display to the user of the second vehicle, in particular graphically, what will change about his motor vehicle and if need be how and on what the settings changes will take effect. He can then make an overall or selective decision about this by selection, for example as a combination of two or more decisions, for example by selecting and/or moving a selection slider.

In a further advantageous configuration according to the first and second aspects, a current composition of a fuel in the tank of the second vehicle is ascertained. Proportions of different fuel types and/or a mix ratio of prescribed fuel components of the fuel with which the vehicle is to be refueled are ascertained for a subsequent refueling taking place in preparation for the future fuel utilization phase on the basis of the current composition of the fuel and the ascertained fuel composition for the second vehicle.

By way of example, a computer program, in particular an app (application software), takes the data captured during multiple preceding refueling operations as a basis for computing how much of which fuel type is used for refueling, such that said fuel types mix in the tank of the vehicle to produce a (new) optimum mix. Preferably, adaptive admixtures or mix ratios are also ascertained and/or retrieved. These can also be implemented by the energy point and/or added by the user on the basis of the information generated in the method. In particular, it is also possible for an optimized fuel composition to be ascertained within an energy type.

The fuel composition in the invention can relate in particular to:
 components having different octane numbers, and/or
 ethanol components (and respectively related types), and/or
 methyl tert-butyl ether (MTBE) and/or ethyl tert-butyl ether (ETBE), and/or
 lubricants and additives, and/or
 exhaust-gas-reducing active agents, and/or
 brand-specific active agents (also in some cases "psychological" active agents linked to particular images, slogans or ideas).

Preferably, the invention involves the provided profile data record being taken as a basis for varying the proportions of MTBE and/or ETBE (methyl tert-butyl ether and ethyl tert-butyl ether) in the fuel delivered. Since the need of different vehicles for these substances in the case of different constraints is different, a very great environmental benefit and cost benefit, possibly even a tax advantage, can be attained if these admixtures are admixed adaptively, in particular only to the required, useful extent, within the context of the invention. The mix ratio of these substances can also be adjusted to suit or optimized at least in part if two fuel types that are mixable, for example in the tank of the vehicle, are combined.

The profile data record can comprise one or more families of characteristic curves expressed in scientific terms and comprising one or more optimized parameters (parameter relationships) for the optimized fuel on the basis of the aforementioned criteria, in particular also in regard to external conditions.

The invention therefore also comprises control of an apparatus at the filling station for altering the characteristic values. Preferably, this relates to stepless control (or control in small steps) of the fuel composition. The invention therefore also includes an energy point, in particular filling station, that produces fuel ratios that are mixable freely or in fine steps.

In a further advantageous configuration according to the first and second aspects, the values of the at least one energy utilization characteristic quantity are stored and/or provided in association with the respectively associated values of the at least one fuel parameter. Further, the profile data record for the second vehicle is also ascertained on the basis of the values of the at least one fuel parameter that are associated with the provided values of the at least one energy utilization characteristic quantity.

In a further advantageous configuration according to the first and second aspects, the energy utilization characteristic quantity (in a first vehicle and/or in a second vehicle) is ascertained on the basis of one or more variables representative of at least one exhaust gas characteristic quantity and/or an actually achieved torque characteristic curve and/or at least one captured variable from a knock sensor of the internal combustion engine of the vehicle and/or one or more ignition angles and/or ignition times.

The invention is distinguished, according to a second aspect, by a system, wherein the system is designed to ascertain at least one value of an energy utilization characteristic quantity that represents a first energy utilization process in a first vehicle, to ascertain at least one value of a parameter that represents at least one constraint of the energy utilization in the first vehicle during the first energy utilization process, and then to ascertain a mathematical relationship between at least one or more of the provided values of the at least one energy utilization characteristic quantity, the applicable values of the parameters of the first vehicle and one or more parameters for a possible second energy utilization process of a second vehicle. Further, the system may be configured to provide a data record and/or learning data on the basis of the at least one ascertained mathematical relationship, in so doing to provide a profile data record comprising the learning data and/or the data record. Further, the system may be configured so as, depending on said profile data record, to take the data of the at least one first vehicle and the at least one second parameter as a basis for ascertaining a fuel composition and/or a split of energy types for a drive system of at least one second vehicle and/or control data for an energy distribution process in a second vehicle for a second energy utilization process.

Preferably, the system is further configured to prompt a change in the split of energy types for a drive system at least of a second vehicle and/or to control an energy distribution process in a second vehicle for a second energy utilization process.

Preferably, the system is further configured to carry out the method according to the first aspect and/or in line with one or more features characterized in this document during operation, in particular as claimed in one of claims 1 to 16. In this case, the system has the same advantages as the method.

The invention is distinguished, according to a third aspect, by a mobile user appliance that is designed to ascertain a mathematical relationship between at least one or more provided values of at least one energy utilization characteristic quantity and applicable values of at least one parameter, wherein the energy utilization characteristic quantity represents a first energy utilization process in a first vehicle and the at least one parameter represents at least one constraint of the energy utilization in the first vehicle during the first energy utilization process. Further, the mobile user appliance is designed to provide a data record and/or learning data on the basis of the at least one ascertained mathematical relationship and to provide a profile data record that comprises the learning data and/or the data record and values of at least one second parameter representing a current or predicted constraint of a second energy utilization process of the first vehicle. In addition, the mobile user appliance is designed to take the profile data record and at least one prescribed criterion as a basis for ascertaining a fuel composition and/or a split of energy types for a drive system of the second vehicle for the second energy utilization process.

The mobile user appliance is therefore designed to carry out at least some of the steps of the method for adapting an energy utilization process of a vehicle according to the first aspect. Advantageous configurations of the first aspect also apply to the third aspect in this case. In particular, the mobile user appliance may be designed to transmit the profile data record and/or the ascertained fuel composition or the ascertained split of the energy types to the energy delivery point.

The mobile user appliance may to this end have a wired or wireless interface. The mobile user appliance can comprise a smartphone, a tablet PC, an item of clothing with a suitable electronic apparatus, a smart watch and/or a portable navigation apparatus and so on. Advantageously, it is thus possible for a transmission part and/or sensors and/or computation resources and/or a transmission/reception unit and/or authentication methods of the mobile user appliance to be used or jointly used.

According to a further aspect, the invention is distinguished by a computer program, wherein the computer program is designed to perform the method according to the first aspect or an advantageous configuration of the method according to one or more further features of the method. In particular, the computer program is a software program executable e.g. as an app ("application") for one or more types of mobile user appliances. Preferably, it may be a brand-specific software program, in particular also configured to handle customer, user or billing data. The computer program product may in this case be in the form of an update for a previous computer program that, by way of example, comprises the portions of the computer program or of the corresponding program code as part of a feature extension, for example as part of what is known as a "remote software update".

According to a further aspect, the invention is distinguished by a computer program product that comprises executable program code, wherein the program code carries out the method according to the first aspect or an advantageous configuration of the method according to the first aspect when executed by a data processing apparatus. The computer program product comprises in particular a medium that is readable by the data processing apparatus and on which the program code is stored.

According to a further aspect, the invention is distinguished by a program product that comprises an authorized access right to stored data of the computer program product.

The vehicle is preferably a motor vehicle or motorcycle. This results in multiple advantages described explicitly within the context of this document and multiple further advantages comprehensible to a person skilled in the art. A particularly great advantage is obtained in the case of application to a vehicle fleet (multiplicity of first vehicles and/or multiplicity of second vehicles), e.g. associated with one or more, e.g. cooperating, brands or members of an organization or with a group of a social network, etc. The method can thus comprise authorization to access particular profile data records. Therefore, it is e.g. also possible for an application in error to be avoided.

In particular, the method also comprises providing at least one profile data record by means of wireless transmission of applicable data packets and/or sections of the data stream of the profile data record in a "method" (for example a push method), in particular prompted or controlled by a computation unit arranged outside the (first) vehicle, or e.g. by a method (for example a "pull method") prompted or controlled by a computation unit (installed or carried in the second vehicle) of the vehicle.

According to an advantageous development, one or more profile data records may be linked to one or more particular application condition(s), in particular so as to represent one or more application conditions. Preferably, the profile data records can comprise one or more such application conditions. In this case, an embodiment of the method, in particular one consistent with the profile data record, can take place on the basis of the satisfaction of at least one application condition in the second vehicle. Explained in simplified terms, a profile data record can comprise a "package insert" having one or more application conditions, the at least one application condition being able to be checked in a second vehicle and/or in a mobile user appliance when the method is applied.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows an exemplary function block diagram for a system for controlling an energy utilization process of a vehicle.

DETAILED DESCRIPTION OF THE DRAWING

The enclosed single FIGURE shows an exemplary function block diagram for a system according to the invention for controlling the supply of energy to a vehicle. The system relates to at least one first vehicle 10, 10', which can be regarded as part of the system. The first vehicle 10, 10' has an internal combustion engine as a drive unit, for example. Alternatively or additionally, the first vehicle 10, 10' can have an electric drive. The first vehicle 10, 10' has a first control apparatus. Optionally, the system has at least one mobile user appliance 14 that can be used by a respective user of the first vehicle 10, 10' to control the supply of energy to the first vehicle 10, 10'. By way of example, the first mobile user appliance 14 may be a smartphone, a tablet PC and/or a plug-in navigation appliance.

The first control apparatus (a computation unit of the applicable apparatus or of the system) is designed to capture and/or ascertain values of at least one energy utilization characteristic quantity K_1 representing a first energy utilization process in the first vehicle. The energy utilization characteristic quantities can also be referred to as first influencing variables, each representing a specific energy utilization property of a particular vehicle or of a particular vehicle type.

Further, the first control apparatus is designed to capture and/or ascertain values of at least one parameter P_1 representing at least one constraint of the energy utilization in the first vehicle 10, 10' during the first energy utilization process. The first control apparatus is designed to store the values of the at least one energy utilization characteristic quantity K_1 in association with the respectively associated values of the at least one parameter P_1 and to provide them on a first data interface (denoted by "backend").

Further, the first control apparatus is designed to ascertain one or more parameters P_2, for a possible second energy utilization process of a second vehicle 20, 20', 20", representing at least one constraint of the energy utilization in the second vehicle 20, 20', 20" during the second energy utilization process. These may be values (parameter values) that have been pre-ascertained, estimated, read, predicted for the near future or interpolated.

The first mobile user appliance 14 is designed to ascertain a mathematical relationship between at least the one or more of the provided values of the at least one energy utilization characteristic quantity K_1 and the applicable values of the parameters P_1 and to provide a data record and/or learning data on the basis of the at least one ascertained mathematical relationship. Optionally, it is already also possible for a parameter P_2 to be ascertained and taken into consideration in this step of the method.

Further, the first mobile user appliance 14 is set up to ascertain values of at least one optional second or further parameter, representing a current or predicted constraint of a second energy utilization process of the second vehicle, and to provide a profile data record comprising the learning data and/or the data record and the values of the at least one second parameter. According to the enclosed FIGURE, this second or further parameter is an optional energy parameter EP_1 and/or what is known as a vehicle parameter EE_1.

Depending on the profile data record of the first vehicle and at least one prescribed criterion, the invention involves a fuel composition and/or a split of energy types for a drive system of the first vehicle being ascertained for a second energy utilization process. The aforementioned second or further parameters can also be referred to as second influencing variables, representing a current or predicted constraint or circumstance of the second energy utilization process of the first vehicle.

The split of the energy types may be, e.g. characteristic as values, individual proportions, a ratio between the proportions and/or a time sequence or a sequence based on the route. By way of example, the fuel composition can be provided by means of (monitored, controlled) addition of ammonia-containing substances, e.g. what is known as an AdBlue, related or further-developed technologies. By way of example, it is also possible for nanoparticles having particular properties to be admixed or introduced.

It is thus possible for the second or further parameters to be ascertained from navigation data, for example, and/or from weather data and/or calendar data. The energy utilization characteristic quantities K_1 can be ascertained from the vehicle service data and/or garage data and/or from the vehicle electrical system. The values of the at least one second parameter can also be ascertained on the basis of at least one prescribed route attribute of a route section traveled or to be traveled and/or on the basis of driving times of the first or of a second vehicle 20, 20', 20", for example. In particular, it is thus possible for an energy supply type of the first vehicle 10, 10' to be adapted on the basis of at least one prescribed route attribute of the route section traveled or to be traveled and/or on the basis of the driving times. By way of example, for the adaptation of the energy utilization, it is possible to take into consideration whether a journey by day or night is involved.

Further, specific target values for noise pollution, $CO_2$ emissions, fine dust emissions, emissions of nitrogen oxide, etc. can be taken into consideration on particular route sections.

Said target values for the energy utilization characteristic quantity can be chosen differently in the invention on a location-to-location basis. Alternatively or additionally, one or more such target values can be chosen or ascertained e.g. on the basis of environmental zones.

It is thus also possible for a piece of information about the environmental zones of particular route sections to be taken into consideration. By way of example, an environmental zone can be ascertained using means of the first vehicle or of a second vehicle 20, 20', 20" and then the ideal proportion of a particular energy type can be ascertained that suits the respective route sections. In particular, the route sections having particular environmental zones can be ascertained in this case from a navigation map and/or from the backend and/or by means of road sign recognition, for example including with a camera. The optimized proportions of the energy types can then be ascertained and/or the first vehicle 10, 10' can then change over thereto as appropriate when traveling on the route.

The values of the at least one second parameter can alternatively be ascertained on the basis of a driving statistic of the first vehicle and/or a vehicle setting for a drive mode of the first vehicle and/or at least one precomputed route for the first vehicle and/or a predicted exterior temperature and/or current exhaust gas data of the first vehicle and/or data from a knock sensor of the internal combustion engine of the first vehicle and/or calendar data of a user of the first vehicle and/or driver settings of the first vehicle 10, 10' or of the second vehicle 20. Further dependencies can exist for use of the first vehicle or of the second vehicle 20, 20', 20" for a specific purpose.

The driving statistic can comprise a route length statistic and/or speed statistic and/or a height profile statistic (mountainous/flat) and/or traffic density statistic (urban/rural), for example. The vehicle settings, e.g. "comfort", "sport", "normal" can be ascertained on the basis of settings of a driving experience switch that are used at present and/or have been used in the past. The at least one precomputed driving route can comprise an ascertained most probable route of the vehicle 10, 10', 20, 20', 20". The current exhaust gas data can be ascertained by means of a regulated catalytic converter of the vehicle, for example. The driver settings can also include direct user settings and/or (current or predicted) requirements of the user that are detected using means of the vehicle and/or of the mobile user appliance. The use for the specific purpose may be a rescue action, for example.

To ascertain the values of the at least one second parameter, the mobile user appliance 14 may be configured to retrieve the applicable data for the first vehicle 10, 10' from a prescribed software application (also referred to as an app), from specifically managed data records or from the Internet via a wireless interface and to make allowance for them in accordance with special or specific scientific relationships, for example. In this context, optimum values for energy delivery can be indicated, read aloud and/or transmitted directly or indirectly to the energy supply point for an energy supply process, for example. Preferably, in the case of rental vehicles, it is also possible for calendar data or plans of one or more subsequent user(s) and/or data of the subsequent user(s) to be taken into consideration in the manner described above.

A profile data record Rec formed from the energy utilization characteristic quantities K_1 and the parameter(s) P_1, EP_1, EE_1 comprises prescribed calculation formulae for ascertaining an optimized fuel composition and/or an optimized split of the fuel types and/or energy types, for example. In particular, the calculation formulae can be adapted on the basis of the learning data. The (selected) profile data record Rec, Rec', Rec'' is ascertained and provided in particular on the basis of the data record and/or the learning data, which are obtained on the basis of the at least one ascertained mathematical relationship. The applicable mathematical relationship is ascertained in particular between at least one or more of the provided values of the at least one energy utilization characteristic quantity and the applicable values of the parameters.

Optionally, the profile data record can comprise energy preset data that can be changed via a user of the first vehicle and are representative of a minimum intake quantity of at least one of the energy types of the first vehicle at an energy supply point and/or are representative of a limitation for fuel grades for the first vehicle and/or are representative of an association between fuel grades and the first vehicle. In particular, this also allows incorrect refueling (for example diesel/gasoline) to be automatically prevented. In this case, for example the ascertained values of the at least one second parameter and a piece of information about refueling performed or intended (from the gas pump) can be taken as a basis for outputting a piece of information or a warning and/or preventing or interrupting the supply of fuel. In this case, the at least one second parameter can also, by way of example, comprise the limit values for the octane number, for example of 94-96 or of 91 to 96, which are dependent on a particular vehicle. In this case, the at least one second parameter can also comprise benchmarks for a "freely composable mix", for example, including within a fuel type. In this case, the user can also determine the factors on which his optimum energy mix will be more or less dependent, for example including the desired consideration of the environment.

Preferably, the ascertained fuel composition and/or the split of energy types for the drive system of the first vehicle 10 for a second energy utilization process is/are taken as a basis for transmitting a preset for a respective delivery quantity of the energy types and/or of the respective fuel types and/or of the fuel composition to an energy supply point. The energy supply point is in this case ascertained on the basis of a position of the first vehicle, for example. The position of the vehicle can be ascertained by means of a global positioning system (GPS), for example.

The above-described split of the functions of the first control apparatus and of the first mobile user appliance 14 is exemplary and can also take place differently. Further variants are that the profile data record Rec is ascertained using means of the first vehicle, for example, in particular also is transmitted to a fixed memory or computation unit, e.g. a cloud, backend (as shown) or Internet portal, on the basis of the data of the first mobile use appliance 14 and the profile data record Rec or information dependent thereon.

The FIGURE additionally depicts a plurality of second vehicles 20, 20', 20'' using data of the first vehicle 10, 10' (or of the multiple first vehicles 10, 10'). These can receive this profile data record Rec, Rec', Rec'' via the respective second mobile user appliance 14' in this case. In the respective second vehicle 20, 20', 20'', a piece of adaptation information AI for the energy supply for the drive system of the respective second vehicle 20, 20', 20'' can be obtained from an energy utilization characteristic quantity K_2, which may in particular be a target value K_2_target, obtained in said second vehicle. The drive system of said second vehicle can be operated with various energy types, such as EP_A, EP_B, EP_C. When the adaptation information is ascertained, this also involves constraints of the energy utilization P_2, P_2' (preferably more or less as an analog for the constraints of the energy utilization P_1 of the first vehicle) being ascertained as parameters in the respective vehicle 20, 20', 20'' in advance. Hence, the profile data record Rec' is thus adapted to suit the respective second vehicle 20, 20', 20''. In this case, a specified parameter (specified vis-à-vis an expected, pre-ascertained parameter P_2 or parameter value) is referred to as P_2'. Such a parameter can then be applied in a second vehicle, e.g. shortly before the ascertained data are applied.

Even though this FIGURE depicts a piece of adaptation information AI only for second vehicles 20, 20', 20'', such adaptation information can naturally also be provided for the first vehicle 10, 10', specifically for a second energy utilization process, since the profile data record Rec has been obtained from a first energy utilization process, of course.

The text below briefly describes a possible flowchart for a program for adapting an energy utilization process of a vehicle for the first mobile user appliance:

The program is started in a first step. In a subsequent step, values of at least one, preferably multiple, prescribed energy utilization characteristic quantity (quantities) (K_1) representing an energy utilization in a first vehicle 10, 10' are read in. In association with the values of the energy utilization characteristic quantities, respective associated values of at least one, preferably multiple, prescribed parameter(s) (P_1, EP_1, EE_1) are read in and/or stored that represent a constraint or circumstance of the first energy utilization process. The constraint or circumstance relates to the first vehicle and/or the internal combustion engine thereof and/or an electric drive and/or the surroundings of the first vehicle, for example. The respective energy utilization characteristic quantities are provided by a first control unit of the first vehicle.

The at least one energy utilization characteristic quantity is representative of at least one exhaust gas characteristic quantity and/or an actually achieved torque characteristic curve and/or of at least one captured variable from a knock sensor of the internal combustion engine of the first vehicle and/or of one or more ignition angles and/or ignition times, for example.

An aforementioned exhaust gas characteristic quantity can comprise data from a regulated catalytic converter of the first vehicle and/or the data from the regulated catalytic converter in combination with further data from the first vehicle or from the first mobile user appliance 14. In particular, the at least one exhaust gas characteristic quantity is suitable for describing properties of the exhaust gas of the first vehicle. The actually achieved torque characteristic curve may be dependent on a supply of fuel, in particular based on different modes of operation of the drive system of the first vehicle. Preferably, the torque characteristic curve is stored in association with these parameters.

These energy utilization characteristic quantities can preferably be captured using means inside the first vehicle and/or can be ascertained from the data captured using means of the first vehicle, for example with a computation unit of the first vehicle or with the first mobile user appliance 14, e.g. via an interface, similar to an onboard diagnosis interface. The ascertained energy utilization characteristic quantities may be either scientifically expressed successions, sequences or time functions, etc., or scientifically expressed relationships, e.g. as a formula or formula coefficient, between two or more characteristic quantities themselves or one or more characteristic quantities and on the basis of one or more parameters each representing a circumstance of the energy utilization or constraint of the energy utilization. The data from a knock sensor, the ignition angles and ignition times can also result in statistical data and/or dependency data and/or correlation data being collected, read and utilized. By way of example, what is known as the OCB (onboard diagnosis) interface is also suitable for this.

The values of said parameters can be provided by the first vehicle, for example, by means of a navigation apparatus and/or the first control apparatus and/or the onboard computer of the first vehicle. Alternatively or additionally, the values of the parameters can be provided by second vehicle-external devices, for example a backend of the vehicle manufacturer, for example. Alternatively or additionally, the values of said parameters can be provided by the mobile user appliance 14 itself.

In a subsequent program step, the data record and/or the learning data are ascertained and a profile data record taking into consideration the data record and/or the learning data and the values of the at least one second parameter is provided. The data record and the learning data for the first vehicle are ascertained on the basis of at least some of the stored and provided values of the at least one energy utilization characteristic quantity and the associated values thereof. In particular, coefficients are ascertained for the profile data record based on a prescribed mathematical relationship, for example representing prescribed equations, polynomials or simulations.

The data read in from the first vehicle or ascertained in the first vehicle, which data are read using the first mobile user appliance 14, for example the smartphone of the user, for example via the onboard diagnosis interface, by means of what is known as WPAN (Wireless Personal Area Network) technology or WLAN, etc., can be used together with further data to ascertain the profile data record Rec with a piece of application software and then to distribute said profile data record as appropriate. Together with the parameters of the energy utilization that characterize the constraints, only some of which are likewise captured using the first mobile user appliance 14 and/or can be conditioned by the first mobile user appliance 14, the profile data record Rec, Rec', Rec" and in particular the learning data are ascertained.

Optionally, in the program step just explained, a resultant profile data record Rec_res can be ascertained by virtue of multiple profile data records that have been ascertained and provided by a multiplicity of first vehicles being taken as a basis for ascertaining a resultant profile data record.

The profile data record Rec, Rec', Rec" can be fused and/or aggregated with earlier profile data records of this kind for this purpose, for example by means of a software application, and/or transmitted by means of a customer portal, cloud or backend. It is then possible for the profile data records of the many first vehicles to be used by other users of the vehicles, namely the "second vehicle" in this case. Such a cloud, pool or an applicable server may be part of the system, or perform part of the system.

In this case, the scope of the invention includes an appropriately set-up server, cloud or backend and an applicable (cloud backend) service. Further, it includes the provision and/or use of the data in accordance with the features of the invention to at least one second vehicle or in at least one second vehicle.

Preferably, the first vehicles 10, 10' in this case are each of an identical type or related type. The respective profile data records may have been ascertained by taking into consideration identical or different constraints in this case. This has the advantage that the profile data records may be much more accurate and comprehensive. It is also possible for the learning data that have been ascertained over multiple energy utilization phases in the first vehicles under different constraints to be aggregated with one another, for example to have allowance made for them with a particular aim.

In a subsequent program step, the fuel composition, in particular the optimum fuel composition, is ascertained, for example, and/or energy types of the internal combustion engine and/or the electric drive are preferably split as advantageously as possible. By way of example, there may be provision for a user to use a prescribed operator control apparatus of the first vehicle and/or the first mobile user appliance 14 to prescribe a selection and/or weighting of optimization criteria for the fuel composition or the split of the energy types. Simple prescribing of the optimization criteria can involve two or more options and relationships between the options being displayed. Preferably, at least two mutually influencing options can be depicted by means of a selection slider and/or spider diagram and/or a two-dimensional or three-dimensional selection space for selecting the optimization criteria. In this case, the optimization criteria may be positive, representing a value for an achieved or achievable benefit, e.g. reaching maximum values and/or negative, representing values for accomplished or possible avoidance or reduction (e.g. reduction of consumption, price, reduction of $CO_2$ emissions, emissions of nitrogen oxides and reduction of costs, etc.).

Alternatively or additionally, the profile data record Rec can be taken as a basis for ascertaining a set of possible settings changes for adapting the supply of energy, and a further prescribed selection of the settings changes can then be taken as a basis for ascertaining the optimum fuel composition and/or the optimum split of the energy types.

Advantageously, one or more profile data records can also be taken as a basis for deriving a piece of information pertaining to an improvement in particular parameters of the vehicle components. In particular, the ascertained data can be taken as a basis for improving the quality of the vehicle components during development or production specifically and efficiently. It is also possible for valuable data and/or information pertaining to the improvement of particular vehicle components, the supplier products or third-party products directly or indirectly to be obtained. For example, weaknesses in vehicle components can thus be identified easily and/or explicitly and evaluated to the advantage of the consumer or of the vehicle manufacturer.

The sending, receiving or interchange and the aggregation of the respective profile records may preferably be configured at least in part by means of at least one mobile user appliance set up for this purpose. In this case, targeted interchange of optimization information between two or more users can also take place. As a result, these data intended for interchange can also be configured in extremely compact and, if necessary, absolutely uncritical, in regard to data protection, fashion. By way of example, the interchange can take place via a cloud network, an Internet portal, Bluetooth, etc.

In a further advantageous configuration according to the first and second aspects, the provided profile data record of the first vehicle is taken as a basis for ascertaining a set of settings changes for the energy utilization of the first vehicle, and a prescribed selection of the settings changes is taken as a basis for ascertaining the fuel composition and/or the split of energy types for the drive system of the first vehicle for the second energy utilization process.

The split of the energy types may be, e.g. characteristic as values, individual proportions, a ratio between the proportions and/or a time sequence or a sequence based on the route. These can be ascertained in the method (e.g. for one or more second energy conversion processes, possibly based on positions, routes and times) and applied as appropriate, e.g. in a second vehicle during one or more second energy distribution processes.

The selection of the adaptation measures can be made by means of prescribed operator control operation of the input apparatus. In this case, acceptance or alteration of settings can be visually displayed in particular graphically on a display apparatus of the second vehicle and/or of the mobile user appliance. It is also possible for the settings changes pre-ascertained for the first vehicle and/or a probable result of the settings change to be depicted. In this case, the settings changes can also be selected individually or all together by the user. It is thus possible to visually display to the user of the second vehicle, in particular graphically, what will change about his motor vehicle and if need be how and on what the settings changes will take effect. He can then make an overall selective decision about this by selection, for example as a combination of two or more decisions, for example by selecting and/or moving a selection slider.

In a further advantageous configuration according to the first and second aspects, a current composition of a fuel in the tank of the first vehicle is ascertained. Proportions of different fuel types and/or a mix ratio of prescribed fuel components of the fuel with which the vehicle is to be refueled are ascertained for a subsequent refueling taking place in preparation for the future fuel utilization phase on the basis of the current composition of the fuel and the ascertained fuel composition.

By way of example, the method involves ascertaining, e.g. by means of a computer product as a piece of application software, how much of which fuel type is used for refueling, such that said fuel types mix in the tank of the vehicle to produce an optimum mix. Preferably, adaptive admixtures or mix ratios are also ascertained and/or retrieved. These can also be implemented by the energy point and/or added by the user on the basis of the information generated in the method. In particular, it is also possible for an optimized fuel composition to be ascertained within an energy type.

A further advantage of the invention is that the energy utilization, in particular the fuel utilization, or wear and/or consumption of vehicle components of vehicles, can be adapted to suit fuel standards that have changed during a life of the vehicle and/or new fuel types.

A particular advantage of the method is that it allows an output of emissions, that is to say: exhaust gases or exhaust gas components of a particular type, to be reduced. By way of example, particular types of emissions or particular components of emissions can be reduced within particular locations.

Otherwise, a second vehicle 20, 20', 20" may also be a first vehicle 10, 10' for a later interval of time. In other words, one and the same vehicle 20, 20', 20" may be a first vehicle 10, 10' for a first interval of time (during one or more first energy conversion processes) and may be a second vehicle, or can be operated as such, for a second interval of time (during one or more second energy conversion processes).

It is particularly advantageous that sometimes even no or just slight hardware adaptation of the vehicle is required for carrying out the method, which allows fast market introduction and also vehicles already in production can use the method for adapting the energy utilization without the retrofitting of hardware. The advantages of the method can therefore also be applied (rolled out) for vehicles in production (without retrofitting of hardware).

Depending on the transmitted or read profile data record Rec, Rec', Rec", Rec_res, it is also possible for further alterations or measures, not explicitly mentioned in this document, to be prompted in one or more second vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adapting an energy utilization process of at least one vehicle, the method comprising the steps of:

ascertaining at least one value of an energy utilization characteristic quantity ($K\_1$) that represents a first energy utilization process in a first vehicle, ascertaining at least one value of a parameter ($P\_1$) that represents at least one constraint of the energy utilization in the first vehicle during the first energy utilization process, determining a mathematical relationship between at least one or more of the provided values of the at least one energy utilization characteristic quantity ($K\_1$), the applicable values of the parameters ($P\_1$) of the first vehicle and one or more parameters ($P\_2$) for a possible second energy utilization process of a second vehicle, providing a data record and/or learning data based on the at least one determined mathematical relationship, providing a profile data record (Rec, Rec', Rec") that comprises the learning data and/or the data record, and depending on the profile data record (Rec, Rec', Rec"), data of the first vehicle and the at least one second parameter ($P\_2$, $P\_2'$) are taken as a basis for ascertaining: (i) a fuel composition and/or a split of energy types for a drive system of at least one second vehicle and/or (ii) control data for an energy distribution process in a second vehicle for a second energy utilization process.

2. The method as claimed in claim 1, wherein
at least one value of a second parameter (P_2) relates to a predicted constraint of a particular second energy utilization process of at least one particular second vehicle.

3. The method as claimed in claim 1, wherein
a value of a parameter (P_2) for a current or pre-ascertained constraint of a particular second energy utilization process of at least one particular second vehicle is ascertained.

4. The method as claimed in claim 1, wherein
one or more profile data records (Rec, Rec', Rec") to be used are provided to at least one second vehicle on the basis of a current or pre-ascertained parameter (P_2) for a current or pre-ascertained constraint of a particular second energy utilization process.

5. The method as claimed in claim 1, wherein
a current or pre-ascertained parameter (P_2) for a current or pre-ascertained constraint of a second energy utilization process in a second vehicle is taken as a basis for selecting or combining one or more suitable profile data records (Rec, Rec', Rec") and/or ascertaining a suitable profile data record (Rec, Rec', Rec").

6. The method as claimed in claim 1, wherein
ascertaining, selecting, providing and/or retrieving the at least one profile data record (Rec, Rec', Rec") for a second vehicle is performed on the basis of a target value for at least one emission value (K_2_target) for at least one second energy utilization process in the at least one second vehicle.

7. The method as claimed in claim 1, wherein
the values of the at least one second parameter (P_2) are ascertained on the basis of:
(a) a driving statistic of the first vehicle,
(b) a vehicle setting for a drive mode of the first vehicle,
(c) at least one precomputed route for the first vehicle,
(d) a predicted exterior temperature,
(e) current exhaust data of the first vehicle,
(f) data from a knock sensor of the internal combustion engine of the first vehicle,
(g) calendar data of a user of the first vehicle,
(h) driver settings of the first vehicle, and/or
(i) a use of the first vehicle for a specific purpose.

8. The method as claimed in claim 1, wherein
the split of the energy types for at least one second vehicle comprises a split between:
(a) natural gas and gasoline or diesel,
(b) electric charge and gasoline or diesel, or
(c) natural gas and electric charge.

9. The method as claimed in claim 1, wherein
the at least one energy utilization characteristic quantity (K_1) is representative of a measure of a wear, a consumption and/or a reduction in remaining mileage of a vehicle component.

10. The method as claimed in claim 1, wherein
the at least one parameter (P_1) is representative of a state and/or a remaining mileage of one or more vehicle components of the first vehicle and the parameter (P_2) is representative of a state and/or a remaining mileage of one or more vehicle components of the second vehicle.

11. The method as claimed in claim 1, wherein
the profile data record (Rec) is ascertained and provided for each of a multiplicity of first vehicles,
at least some of the respective profile data records (Rec, Rec', Rec") are taken as a basis for ascertaining and providing a resultant profile data record (Rec_res), and the provided resultant profile data record (Rec_res) is taken as a basis for ascertaining the fuel composition and/or the split of energy types for the drive system of the first vehicle and/or of a second vehicle.

12. The method as claimed in claim 1, wherein
at least the values of the at least one energy utilization characteristic quantity (K_1) and the values of the at least one parameter (P_1), representing at least one constraint of the energy utilization in a first vehicle and/or of a parameter (P_2), representing at least one constraint of the energy utilization in a second vehicle, are each ascertained for prescribed route sections and/or route types and the respective profile data record (Rec, Rec', Rec", Rec_res) is associated with the applicable prescribed route sections or the applicable route type.

13. The method as claimed in claim 1, wherein
prescribed similarity criteria are taken as a basis for associating the respective profile data record (Rec, Rec', Rec", Rec_res) to a prescribed route section and/or a prescribed route type.

14. The method as claimed in claim 1, wherein
the provided profile data record (Rec, Rec', Rec", Rec_res) of the first vehicle is taken as a basis for ascertaining a set of settings changes for the energy utilization of the second vehicle, and
a prescribed selection of the settings changes is taken as a basis for ascertaining the fuel composition and/or the split of energy types for the drive system of the second vehicle for the second energy utilization process.

15. The method as claimed in claim 1, wherein
a current composition of a fuel in the tank of the second vehicle is ascertained, and
proportions of different fuel types and/or a mix ratio of prescribed fuel components of the fuel with which the vehicle is to be refueled are ascertained for a subsequent refueling taking place in preparation for future fuel utilization phase on the basis of the current composition of the fuel and the ascertained fuel composition for the second vehicle.

16. The method as claimed in claim 1, wherein
the energy utilization characteristic quantity (K_1) is ascertained on the basis of:
one or more variables representative of at least one exhaust gas characteristic quantity,
an actually achieved torque characteristic curve,
at least one captured variable from a knock sensor of the internal combustion engine of the vehicle, and/or,
one or more ignition angles and/or ignition times.

17. A system for adapting an energy utilization process of a vehicle, comprising:
one or more processors operatively configured to execute program code to:
ascertain at least one value of an energy utilization characteristic quantity (K_1) that represents a first energy utilization process in a first vehicle,
ascertain at least one value of a parameter (P_1) that represents at least one constraint of the energy utilization in the first vehicle during the first energy utilization process,
determine a mathematical relationship between at least one or more of the provided values of the at least one energy utilization characteristic quantity (K_1), the applicable values of the parameters (P_1) of the first vehicle and one or more parameters (P_2) for a possible second energy utilization process of a second vehicle, provide a data record and/or learning data based on the at least one determined mathematical relationship, provide a profile data record (Rec, Rec', Rec") that comprises the learning data and/or the data record, and depend on the profile data record (Rec, Rec', Rec"), data of the first vehicle and the at least one second parameter (P_2, P_2') are taken as a basis for ascertaining: (i) a fuel composition and/or a split of energy types for a drive system of at least one second vehicle and/or (ii) control data for an energy distribution process in a second vehicle for a second energy utilization process.

18. An apparatus, comprising:

a mobile user appliance operatively configured so as to:

ascertain a mathematical relationship between at least one or more provided or read values of the at least one energy utilization characteristic quantity (K_1), applicable values of at least one parameter (P_1) and/or one or more parameters (P_2) for a possible second energy utilization process of a second vehicle, wherein the energy utilization characteristic quantity (K_1) represents a first energy utilization process in a first vehicle and the at least one parameter (P_1) represents at least one constraint of the energy utilization in the first vehicle during the first energy utilization process, provide a data record and/or learning data on the basis of the at least one ascertained mathematical relationship, provide a profile data record that comprises learning data and/or the data record and values of at least one second parameter (P_2) or relates to the values of the second parameter (P_2, P_2'), which relates to a second energy utilization process of the at least one second vehicle, and depending on the profile data record (Rec, Rec', Rec"), take the data of the first vehicle and the at least one second parameter (P_2, P_2) as a basis for ascertaining a fuel composition and/or a split of energy types for a drive system of at least one second vehicle and/or control data for an energy distribution process in a second vehicle for a second energy utilization process.

19. A computer product comprising a computer readable medium having stored thereon program code that, when executed, causes a processor to carry out the steps of:

ascertaining at least one value of an energy utilization characteristic quantity (K_1) that represents a first energy utilization process in a first vehicle, ascertaining at least one value of a parameter (P_1) that represents at least one constraint of the energy utilization in the first vehicle during the first energy utilization process, determining a mathematical relationship between at least one or more of the provided values of the at least one energy utilization characteristic quantity (K_1), the applicable values of the parameters (P_1) of the first vehicle and one or more parameters (P_2) for a possible second energy utilization process of a second vehicle, providing a data record and/or learning data based on the at least one determined mathematical relationship, providing a profile data record (Rec, Rec', Rec") that comprises the learning data and/or the data record, and depending on the profile data record (Rec, Rec', Rec"), data of the first vehicle and the at least one second parameter (P_2, P_2') are taken as a basis for ascertaining: (i) a fuel composition and/or a split of energy types for a drive system of at least one second vehicle and/or (ii) control data for an energy distribution process in a second vehicle for a second energy utilization process.

* * * * *